(12) United States Patent
Choi et al.

(10) Patent No.: US 9,129,637 B2
(45) Date of Patent: Sep. 8, 2015

(54) DISC LOADING DEVICE AND OPTICAL DISC DRIVE INCLUDING THE SAME

(71) Applicant: Toshiba Samsung Storage Technology Korea Corporation, Suwon-si (KR)

(72) Inventors: Un-jin Choi, Suwon-si (KR); Joung-sug Ko, Seoul (KR); Sang-yun Baek, Seongnam-si (KR); Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/682,947

(22) Filed: Nov. 21, 2012

(65) Prior Publication Data

US 2014/0115612 A1     Apr. 24, 2014

(30) Foreign Application Priority Data

Nov. 23, 2011  (KR) ........................ 10-2011-0123124

(51) Int. Cl.
*G11B 17/051*  (2006.01)

(52) U.S. Cl.
CPC .................................... *G11B 17/051* (2013.01)

(58) Field of Classification Search
CPC .. G11B 17/028; G11B 17/0288; G11B 17/04; G11B 17/05–17/0515
USPC ................. 720/600, 601, 602, 606, 609, 610, 720/619–626, 636–638, 645–647, 652
See application file for complete search history.

(56) References Cited

U.S. PATENT DOCUMENTS

| | | | |
|---|---|---|---|
| 6,618,341 B1* | 9/2003 | Yamashita et al. ............ | 720/621 |
| 7,197,753 B2 | 3/2007 | Yokota | |
| 7,533,391 B2 | 5/2009 | Wang et al. | |
| 7,966,627 B2 | 6/2011 | Yang et al. | |
| 2003/0099182 A1* | 5/2003 | Maeda et al. ................ | 369/77.1 |
| 2005/0086674 A1* | 4/2005 | Makisaka et al. ............. | 720/626 |
| 2006/0117330 A1* | 6/2006 | Choi ............................. | 720/619 |
| 2007/0192781 A1* | 8/2007 | Ahn et al. ..................... | 720/714 |
| 2008/0250438 A1 | 10/2008 | Chiou et al. | |
| 2008/0301723 A1* | 12/2008 | Eguchi ......................... | 720/620 |
| 2009/0271810 A1* | 10/2009 | Ahn et al. ..................... | 720/601 |
| 2010/0077416 A1 | 3/2010 | Wang et al. | |
| 2010/0083291 A1* | 4/2010 | Tanaka et al. ................ | 720/609 |
| 2012/0297401 A1* | 11/2012 | Ahn ............................. | 720/621 |

FOREIGN PATENT DOCUMENTS

KR    10-2008-0005090    1/2008

OTHER PUBLICATIONS

Korean Office Action issued Feb. 19, 2013 in counterpart Korean Patent Application No. 10-2011-0123124 (4 Pages, in Korean).

* cited by examiner

*Primary Examiner* — Nathan Danielsen
(74) *Attorney, Agent, or Firm* — NSIP Law

(57) ABSTRACT

Provided is a disc loading device and optical disc drive using the same. The disc loading device includes a loading roller for loading a disc in a main frame, an eject lever for discharging the disc out of the main frame, and a main slider operating the eject lever, and moving in a direction by a disc emergency ejection pin inserted from outside of the main frame.

19 Claims, 8 Drawing Sheets

DISC LOADING DEVICE AND OPTICAL DISC DRIVE INCLUDING THE SAME

CROSS-REFERENCE TO RELATED APPLICATION(S)

This application claims the benefit under 35 USC §119(a) of Korean Patent Application No. 10-2011-0123124, filed on Nov. 23, 2011, in the Korean Intellectual Property Office, the entire disclosure of which is incorporated herein by reference for all purposes.

BACKGROUND

1. Field

The following description relates to a disc loading device and an optical disc drive using the disc loading device, and more particularly, to a roller slot-in type disc loading device.

2. Description of Related Art

Optical disc drives are typically classified into tray type optical disc drives and slot-in type optical disc drives based on a disc loading structure of the drive. The slot-in type optical disc drives are further classified into lever type disc drives and roller type disc drives based on a disc holding structure.

In a roller type disc loading structure, a disc chucking operation is performed right after a disc loading operation. The loading and the chucking operations are performed by a single loading motor. In this structure, the disc chucking is performed while a loading roller is in an idle state, even when the conveying of the disc to a loading position is finished.

In this example, when the conveying of the disc is finished, the disc is stopped by an internal stopper at a chucking location. When the loading roller rotates in this state, the loading roller and the disc may contact each other and scratches may be generated on the surface of the disc. Also, in this state, when an operation of the disc drive is stopped, for example, due to wrong operations of internal devices, the disc may be forcibly discharged which may cause the roller to contact the disc thus generating damages on the surface of the disc.

As described above, the damage of the disc is caused by a structural problem, in which conveying and chucking of the disc are performed by one loading motor. Thus, a solution for addressing this problem is desired.

SUMMARY

In an aspect, there is provided a disc loading device including a main frame, a loading roller configured to load a disc into the main frame, an eject lever configured to discharge the disc out of the main frame, a main slider configured to operate the eject lever, and configured to move in a direction corresponding to the ejection of the disc by a disc emergency ejection pin inserted from outside of the main frame, a loading motor configured to drive the loading roller, and a power train system disposed between the loading motor and the loading roller and comprising a plurality of gears.

The disc loading device may further comprise a power controlling device disposed in the power train system and configured to control a power transmission path toward the loading roller.

The main slider may comprise a rack gear, and the power train system may comprise a pinion gear which is configured to engage with the rack gear.

The power train system may comprise a clutch gear disposed between gears of the power train system, and a clutch lever configured to operate the clutch gear in synchronization with a loading of the disc to block the power transmission path between the gears.

The main frame may comprise a front panel including a slot through which the disc is inserted, and an emergency ejection hole through which a disc emergency eject pin penetrates and which is disposed on the front panel, wherein a front end portion of the main slider faces the emergency ejection hole.

The clutch lever may comprise a third guide pin, and the main slider may comprise a third cam groove in which the third guide pin is inserted.

In an aspect, there is provided an optical disc drive including a main frame, an optical pickup assembly disposed in the main frame, and comprising a spindle on which a disc is mounted and an optical pickup module, a loading roller configured to load the disc into the main frame, an eject lever configured to eject the disc out of the main frame, a main slider configured to operate the eject lever and the optical pickup assembly, and configured to move in a direction corresponding to the ejection of the disc by a manual eject pin that is inserted from out of the main frame, a loading motor configured to drive loading roller, and a power train system disposed between the loading motor and the loading roller, and including a plurality of gears.

The optical disc drive may further comprise a power controlling device disposed in the power train system and configured to control a power transmission path toward the loading roller.

The power controlling device may comprise a clutch gear disposed between the gears of the power train system to control the power transmission path between the gears, and a clutch lever configured to operate the clutch gear in synchronization with the loading of the disc to control the power transmission path.

The main frame may comprise a front panel including a slot through which the disc is inserted, and an emergency ejection hole through which a disc emergency eject pin penetrates and which is disposed on the front panel, wherein a front end portion of the main slider faces the emergency ejection hole.

The main slider may comprise a first cam groove for elevating the optical pickup assembly, and the optical pickup assembly may further comprise a first guide pin that is inserted in the first cam groove.

The main slider may comprise a rack gear, and the power train system may comprise a pinion gear which is configured to engage with the rack gear.

The eject lever may comprise a second guide pin, and the main slider may comprise a second cam groove in which the second guide pin is inserted.

Other features and aspects may be apparent from the following detailed description, the drawings, and the claims.

Figure 1:
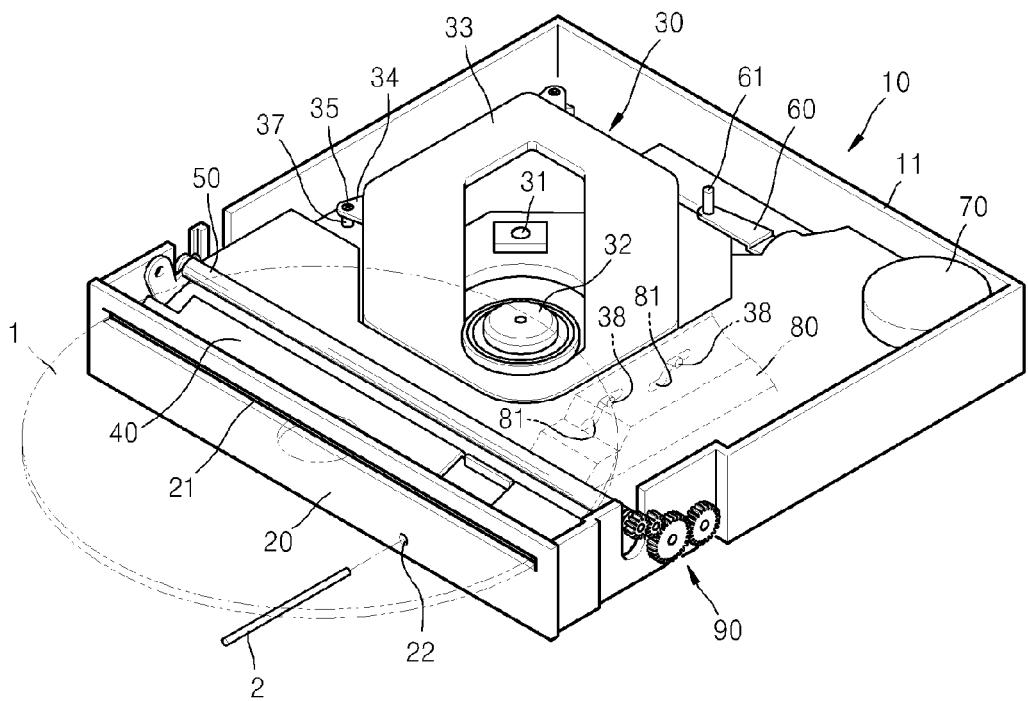
FIG. 1 is a diagram illustrating an example of a slot-in type optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a slot-in type optical disc drive 10 including a disc loading device.

Referring to FIG. 1, a front panel 20 includes a slot 21 through which a disc 1 enters or exits. The front panel 20 is located in front of a main frame 11. An emergency ejection hole 22 is formed in the front panel 20. An emergency ejection pin 2 may be inserted into the emergency ejection hole 22 in order to forcedly push a main slider 80 to forcedly eject the disc 1 using an eject lever 60. The emergency ejection pin 2 presses a front end portion of the main slider 80 to cause the main slider 80 move back, and accordingly, the eject lever 60 connecting to the main slider 80 rotates to forcedly eject the disc 1. The eject lever 60 is rotatably installed on a rear inner portion of a main frame 11 that includes a disc pusher 61 contacting the disc 1.

In this example, a rotating door 40 opening/closing the slot 21 and a loading roller 50 are disposed behind the front panel 20. In addition, an optical pickup assembly 30 is disposed in a cavity on a center portion of the main frame 11. The optical pickup assembly 30 includes a spindle 32, an optical pickup module 31, and a sub-frame 33 supporting the spindle 32 and the optical pickup module 31.

The optical pickup assembly 30 is rotated by the main slider 80 to cause the optical pickup module 31 and the spindle 32 approach/separate to/from the disc 1. To do this, a plurality of fixing wings 34 are formed on the sub-frame 33. For example, the plurality of fixing wings 34 may be fixed on the sub-frame 33 by a screw 35 via a spacer 37 formed of an elastic material such as rubber or sponge. In addition, first guide pins 38 are inserted into first cam grooves 81 disposed on a side surface of the main slider 80 and are disposed on a portion of the sub-frame 33, which is close to the spindle 32. The guide pins 38 elevate and descend based on a reciprocating movement of the main slider 80 to elevate/descend the spindle 32 and the optical pickup module 31.

A loading motor 70 is disposed on a corner of the main frame 11, which is close to the eject lever 60. The loading motor 70 operates the optical pickup assembly 30, the rotating door 40, the loading roller 50, the eject lever 60, and the main slider 80 via a driving power transmission system 90 including a plurality of gears.

Figure 2:
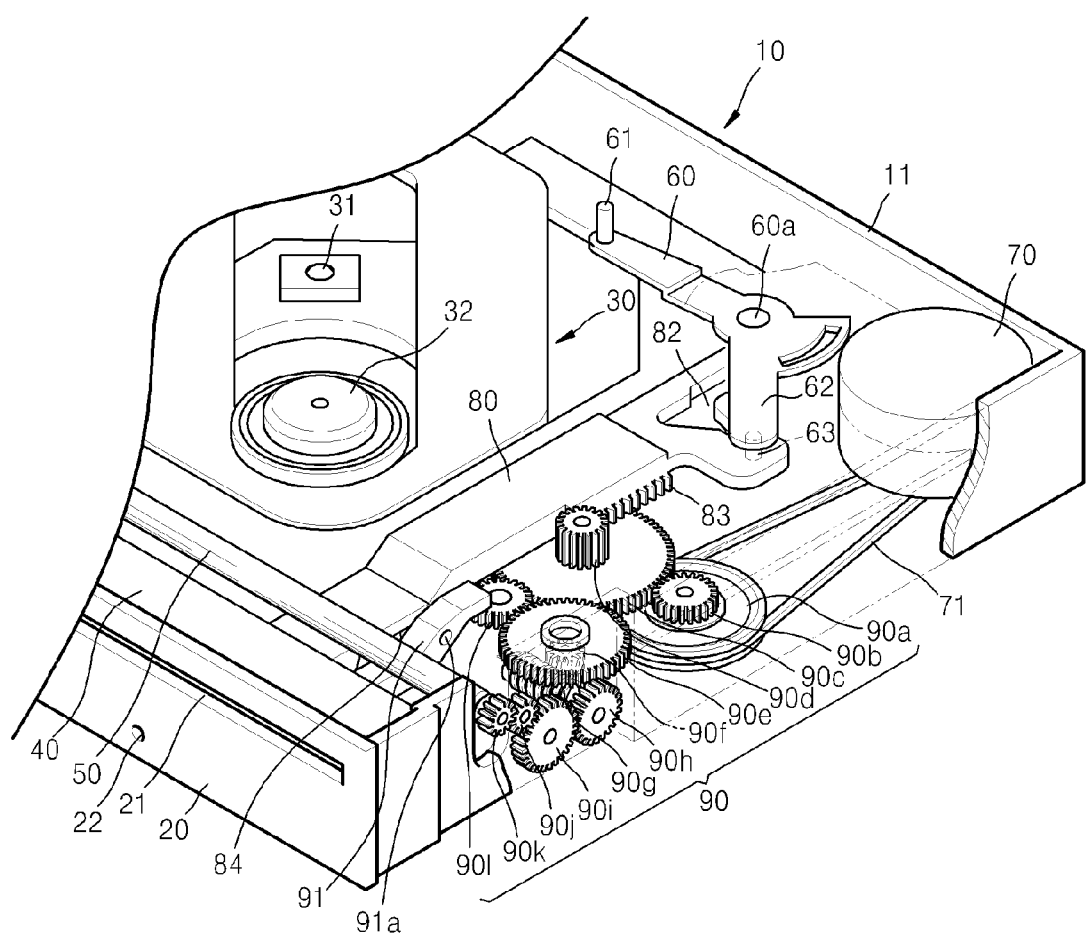
FIG. 2 is a diagram illustrating an example of a driving power transmission system disposed in the slot-in type optical disc drive of FIG. 1.
Figure 3:
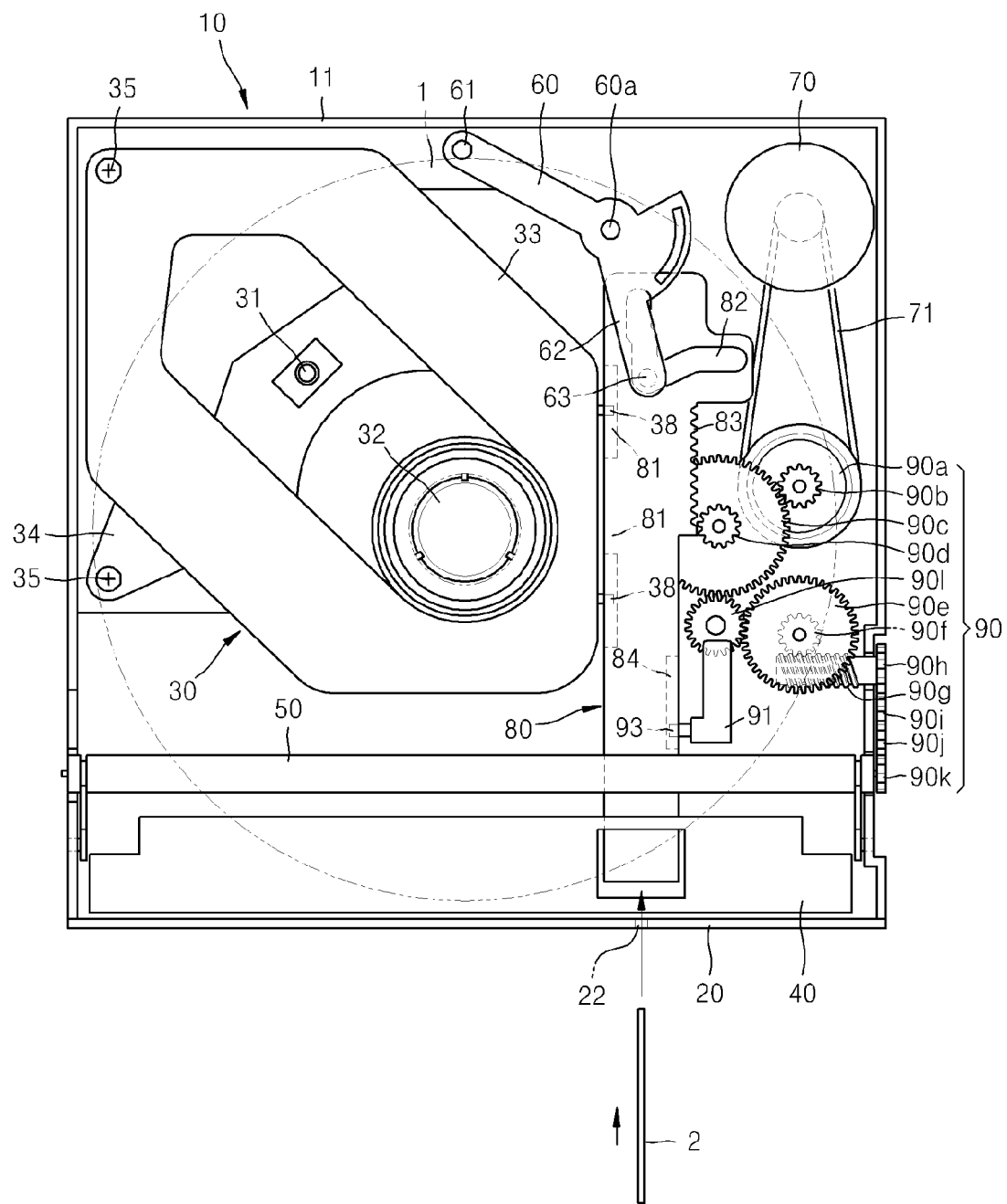
FIG. 3 is a diagram illustrating an example of a driving power transmission system disposed in the slot-in type optical disc drive of FIG. 1.
Figure 4:
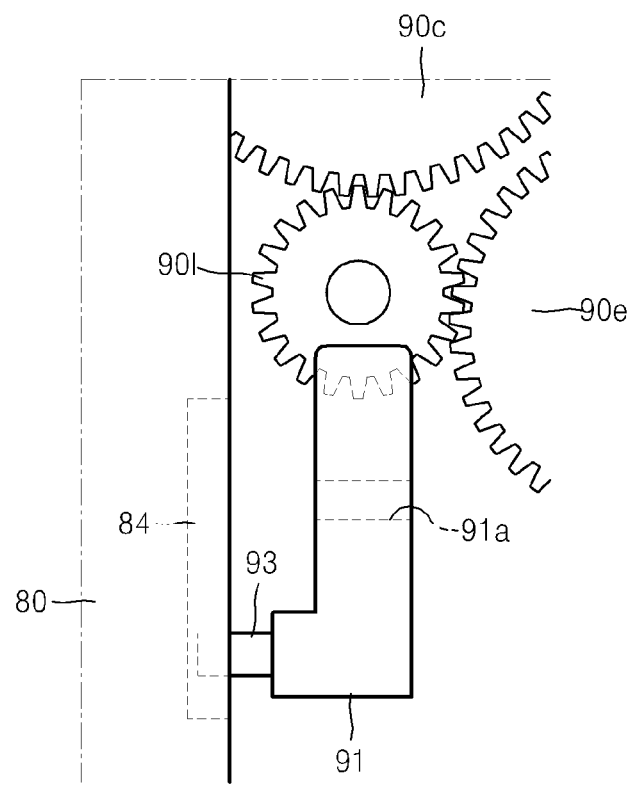
FIG. 4 is a diagram illustrating an example of a driving power controlling device disposed in the slot-in type optical disc drive of FIGS. 1 and 2.

FIG. 2 illustrates an example of the driving power transmission system 90 for transmitting a driving power of the loading motor 70 to the main slider 80 and the loading roller 50. FIG. 3 illustrates another example of the driving power transmission system 90. FIG. 4 illustrates an example of a driving power controlling structure using a clutch gear 90l.

Referring to FIGS. 2 and 3, the loading motor 70 is connected to a pulley 90a via a belt 71, and the pulley 90a is rotated directly by the loading motor 70. A first gear 90b that is coaxial with the pulley 90a is formed integrally with the pulley 90a. The first gear 90b is engaged with a second gear 90c. A third gear 90d is engaged with a rack gear 83 formed on the main slider 80 and is coaxially and integrally formed with the second gear 90c. In this example, the main slider 80 reciprocates a predetermined distance based on the rotation of the loading motor 70.

A fourth gear 90e is located adjacent to the second gear 90c, and the clutch gear 90l that is driven by a clutch lever 91. The clutch gear 90l controls a driving power between the second gear 90c and the fourth gear 90e and is located between the second gear 90c and the fourth gear 90e. The clutch gear 90l may be installed to elastically descend in an axial direction. Thus, in a normal state, the clutch gear 90l is commonly engaged with the second gear 90c and the fourth gear 90e, and when the clutch lever 91 pushes the clutch gear 90l, the clutch gear 90l is separated from the fourth gear 90e.

In this example, the clutch lever 91 rotates based on a rotary shaft 91a. A pressing portion 94 (shown in FIG. 5) contacting the clutch gear 90l is disposed on a front end portion of the clutch lever 91 and a third guide pin 93 that is located at a third cam groove 84 disposed on the side surface of the main slider 80 is disposed on a rear end portion of the clutch lever 91. A worm wheel 90f is disposed under the fourth gear 90e that receives the driving power from the clutch gear 90l, and a worm shaft 90g that is engaged with the worm wheel 90f is disposed besides the worm wheel 90f. The worm wheel 90f and the worm shaft 90g change a moving direction or a rotating direction. In this example, a rotary shaft of the worm wheel 90f is in a vertical direction and a rotary shaft of the worm shaft 90g is in a horizontal direction.

A fifth gear 90h that is coaxially formed with the worm shaft 90g is coupled to the worm shaft 90g, and the driving power from the fifth gear 90h is transmitted to a loading gear 90k through sixth and seventh gears 90i and 90j. Also, the loading gear 90k is coaxially coupled to the loading roller 50 to perform loading and unloading of the disc 1 by the loading roller 50.

The eject lever 60 is installed rotatably around the rotary shaft 60a. A second cam groove 82 for operating the eject lever 60 is formed in the main slider 80 that is reciprocated by the third gear 90d. A second guide pin 63 disposed on an operating lever 62 that is integrally formed with the eject lever 60 located on the second cam groove 82. Therefore, when the main slider 80 reciprocates, the second guide pin 63 located on the second cam groove 82 is moved along with the second cam groove 82. Accordingly, the operating lever 62 and the eject lever 60 that is integrally connected to the operating lever 62, are rotated.

Referring to FIG. 3, the first cam groove 81 is formed on the side surface of the main slider 80, which is close to the optical pickup assembly 30. The first guide pin 38 is inserted in the first cam groove 81 and is disposed on the side surface of the optical pickup assembly 30, which faces the first cam groove 81. The operation (conveying) of the main slider 80 occurs when the third gear 90d and the rack gear 83 are engaged with each other after the disc 1 reaches the chucking position. In this example, the first cam groove 81 elevates the guide pin 38 so that the optical pickup assembly 30 approaches to the disc 1 and the disc 1 is chucked to the spindle 32 while the main slider 80 is conveyed.

The front end portion 80a (shown in FIG. 10) of the main slider 80 is close to the manual ejection hole 22 through which the emergency eject pin 2 penetrates. As shown in FIG. 3, the rack gear 83 of the main slider 80 is engaged with the third gear 90d that is a pinion gear in a state in which the disc 1 is completely inserted. In this state, when the pull back of the main slider 80 starts due to the emergency eject pin 2, the rack gear 83 disengages from the third gear 90d. Thus, the main slider 80 may deeply retrieve into a state in which the main slider 80 is not locked by the pinion gear 90d. The pull back of the main slider 80 causes the eject lever 60 to rotate, and the eject lever 60 is rotated in a counter-clockwise direction so as to forcedly eject the disc 1.

Figure 5:
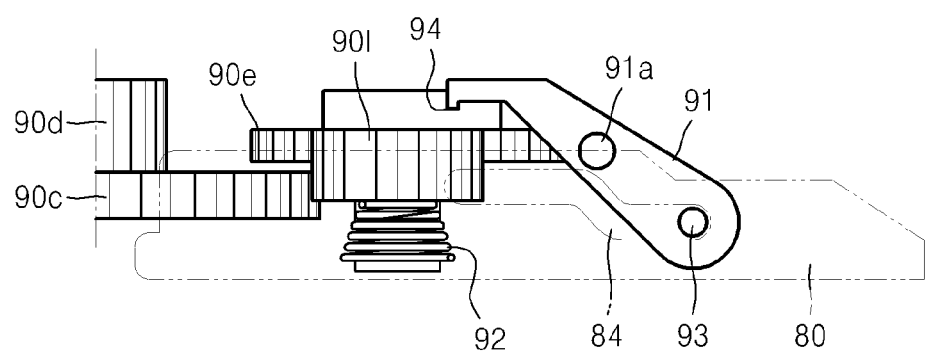
FIGS. 5 through 7 are diagrams illustrating examples of the driving power controlling device during a disc loading and chucking processes performed in the slot-in type optical disc drive shown in FIGS. 1 and 2.
Figure 6:
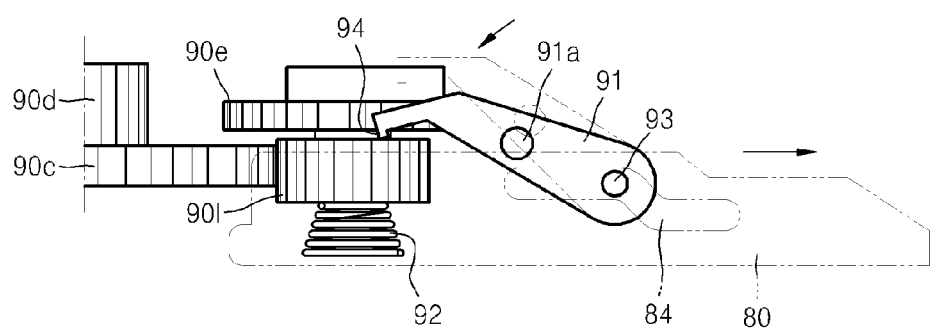
Figure 7:
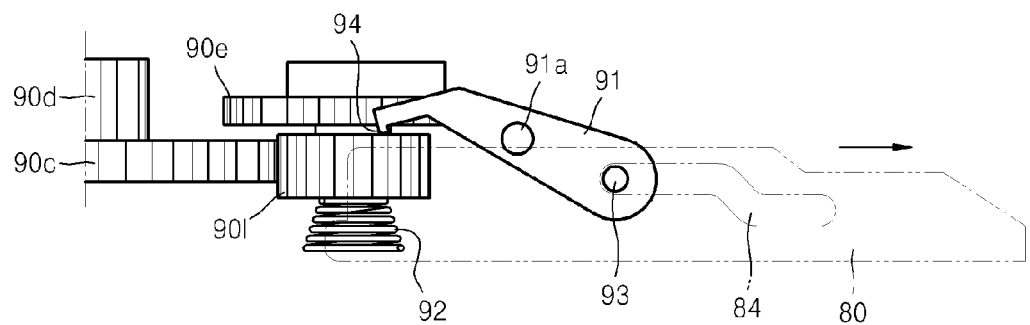

FIGS. 5 through 7 illustrate examples of the clutch lever 91 driven by the main slider 80 and variation in the location of the clutch gear 90l and a driving power controlling state.

FIG. 5 illustrates an example of a normal state in which the front edge portion of the clutch lever 91, that is, the pressing portion 94, is lifted, and accordingly, the clutch gear 90l that is elastically biased by a spring 92 is commonly engaged with the second gear 90c and the fourth gear 90e. This state is an initial stage in which the loading of the disc 1 starts.

FIGS. 6 and 7 illustrate examples in which the main slider 80 moves and the loading is completed, that is, the disc 1 is completely inserted in the main frame 11 so as to be chucked to the spindle. In this state, the second guide pin 93 is elevated by the second cam groove 84 of the main slider 80, and accordingly, the clutch lever 91 is rotated. The pressing portion 94 of the rotated clutch lever 91 pushes the clutch gear 90l so as to be disengaged from the second gear 90c. As such, the rotation of the fourth gear 90f is stopped, and thus, the rotation of the loading roller 50 transmitting the driving power through the fourth gear 90f is stopped.

In this example, the loading roller 50 is not rotated while chucking the disc 1, and accordingly, friction between the disc 1 and the loading roller 50 does not occur. As described above, the rotation of the loading motor 70 is continued even when the loading roller 50 is stopped, and the rack gear 83 of the main slider 80 and the third gear 90d are engaged to start the conveying of the main slider 80. Accordingly, elevation of the optical pickup assembly 30 that is elevated and descended by the first cam groove 81 (see FIG. 1) of the main slider 80 starts and the chucking starts, and finally the state shown in FIG. 8 is obtained.

When the main slider 80 reaches the chucking finish location, the driving of the loading motor 70 is stopped by a location detection switch (not shown) that detects a location of the main slider 80.

Figure 8:
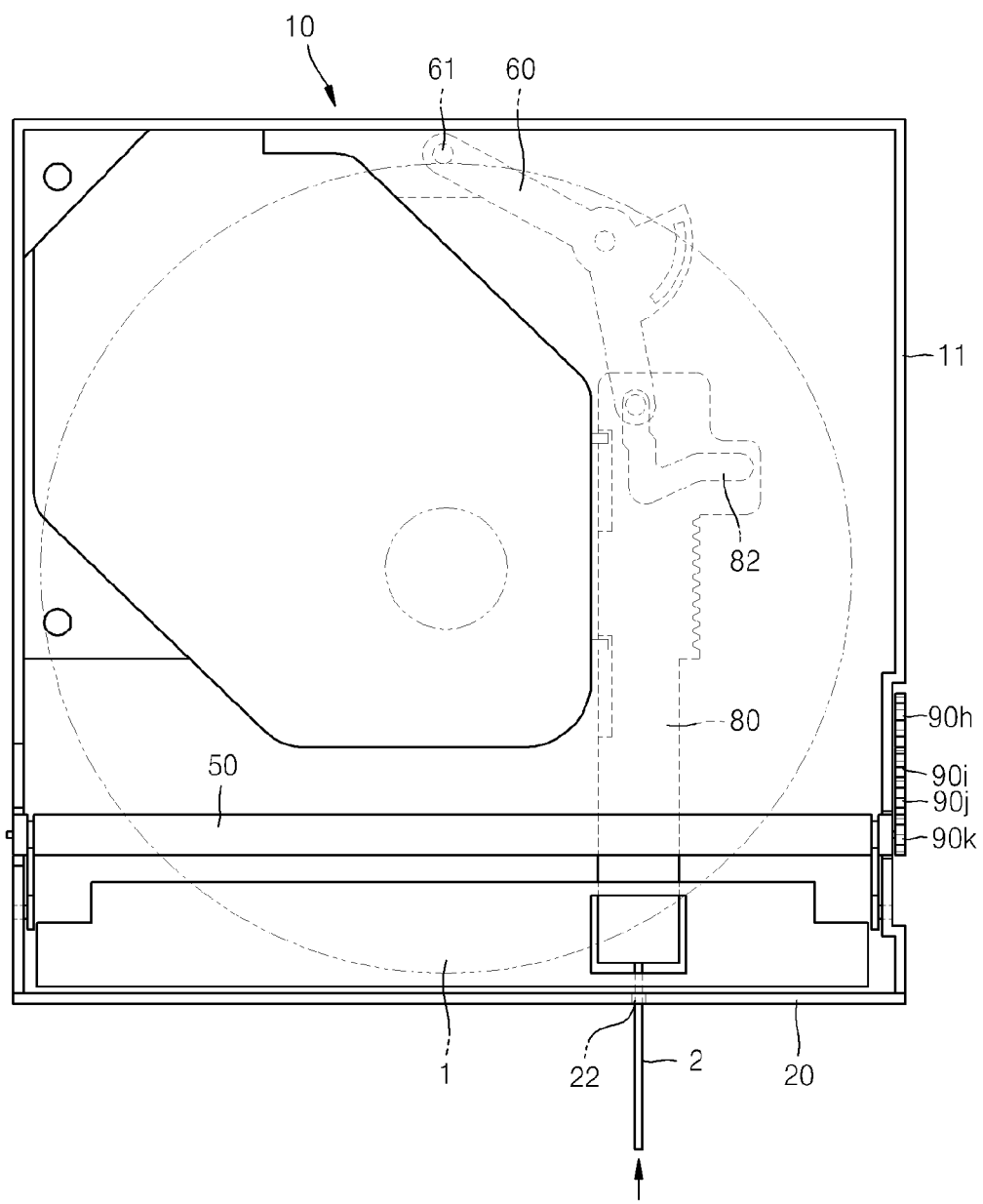
FIG. 8 is a diagram illustrating an example of a state in which the chucking of the disc is finished.
Figure 9:
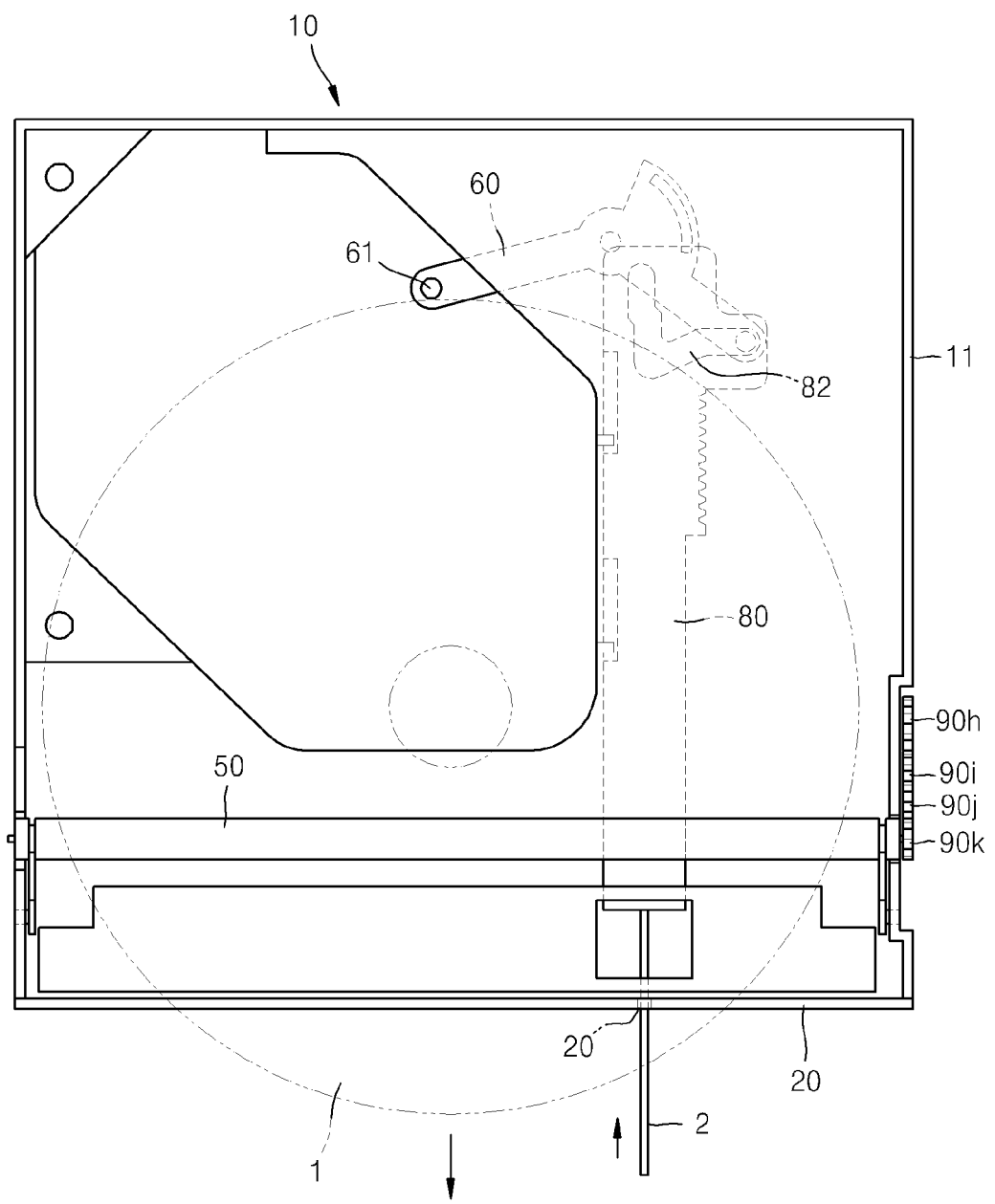
FIG. 9 is a diagram illustrating an example of a manual ejection of the disc when a main slider is pushed by a manual ejection pin.
Figure 10:
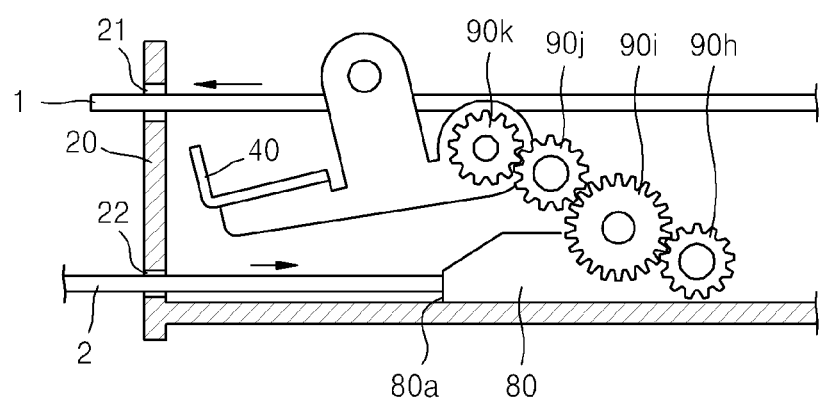
FIG. 10 is a diagram illustrating an example of a manual ejection of the disc when the main slider is pushed by the manual ejection pin.

However, if manual ejection of the disc 1 is necessary in the state shown in FIG. 8, the emergency eject pin 2 is inserted through the manual ejection hole 22 of the front panel 20 to push the main slider 80. According to various aspects, the main slider 80 is pushed, the eject lever 60 is rotated in the counter-clockwise direction by the retrieving main slider 80, and the disc pusher 61 disposed on the front end portion of the eject lever 60 pushes the disc 1. FIG. 9 illustrates an example of a state in which the disc 1 is forcedly ejected by the manual ejection pin, and FIG. 10 illustrates an example of the forcedly ejected state.

According to various aspects herein, after the loading is finished and the chucking starts, the driving power to the loading roller is blocked, and thus, damage of the disc caused by the loading roller may be prevented while performing the chucking of the disc.

In addition, the manual ejection structure of the disc is provided by the main slider that directly drives the eject lever. Accordingly, an additional component for performing the manual ejection operation is not necessary. According to the manual ejection structure of the disc provided by the main slider, the disc may be ejected safely without damaging the disc due to the loading roller.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc loading device comprising:
   a main frame;
   a loading roller configured to load a disc into the main frame;
   an eject lever configured to eject the disc out of the main frame; and
   a power train system comprising
      a clutch gear disposed between gears of the power train system, and
      a clutch lever comprising a guide pin and configured to operate the clutch gear in synchronization with a loading of the disc to block a power transmission path between the gears, wherein
      the power train system is disposed between a loading motor and the loading roller;
   a main slider comprising a cam groove in which the guide pin is inserted and configured to
      operate the eject lever in response to a disc emergency ejection pin being inserted from outside of the main frame, and
      move in a direction corresponding to the ejection of the disc, and wherein the loading motor is configured to drive the loading roller.

2. The disc loading device of claim 1, wherein the main slider comprises a rack gear, and the power train system comprises a pinion gear which is configured to engage with the rack gear.

3. The disc loading device of claim 1, wherein the main frame comprises:
   a front panel including a slot through which the disc is inserted, and
   an emergency ejection hole through which a disc emergency eject pin penetrates and which is disposed on the front panel,
   wherein a front end portion of the main slider faces the emergency ejection hole.

4. The disc loading device of claim 1, wherein the loading roller is configured to stop rotating during the final stage of disc loading to prevent friction.

5. The disc loading device of claim 1, wherein the loading roller is configured to stop rotating while the disc is chucked on the spindle to prevent friction.

6. The disc loading device of claim 1, wherein the main slider comprises a front end portion to receive the pin such that the pin directly contacts the front end portion to apply the force to the main slider.

7. The disc loading device of claim 1, further comprising an operating lever directly connected to the eject lever and a cam groove, the operating lever configured to rotate together with the eject lever.

8. An optical disc drive comprising:
a main frame;
an optical pickup assembly disposed in the main frame, and comprising a spindle on which a disc is mounted and an optical pickup module;
a loading roller configured to load the disc into the main frame;
an eject lever configured to eject the disc out of the main frame;
a loading motor configured to drive the loading roller;
a power train system comprising
a clutch gear disposed between gears of the power train system, and
a clutch lever comprising a guide pin and configured to operate the clutch gear in synchronization with a loading of the disc to block a power transmission path between the gears, wherein
the power train system is disposed between the loading motor and the loading roller; and
a main slider comprising a cam groove in which the guide pin is inserted and configured to
operate the eject lever and the optical pickup assembly, and
move in a direction corresponding to the ejection of the disc.

9. The optical disc drive of claim 8, wherein the main frame comprises:
a front panel including a slot through which the disc is inserted, and
an emergency ejection hole through which a disc emergency eject pin penetrates and which is disposed on the front panel,
wherein a front end portion of the main slider faces the emergency ejection hole.

10. The optical disc drive of claim 8, wherein the main slider comprises a first cam groove for elevating the optical pickup assembly, and the optical pickup assembly further comprises a first guide pin that is inserted in the first cam groove.

11. The optical disc drive of claim 8, wherein the main slider comprises a rack gear, and the power train system comprises a pinion gear which is configured to engage with the rack gear.

12. The optical disc drive of claim 8, wherein the eject lever comprises a guide pin, and the main slider comprises a cam groove in which the second guide pin is inserted.

13. The optical disc drive of claim 8, wherein the loading roller is configured to stop rotating during the final stage of disc loading to prevent friction.

14. The optical disc drive of claim 8, wherein the loading roller is configured to stop rotating while the disc is chucked on the spindle to prevent friction.

15. A disc loading device comprising:
a main frame;
an optical pickup assembly comprising a spindle and being disposed in a cavity on a center portion of the main frame;
a loading roller configured to
load a disc into the main frame;
a loading motor configured to drive the loading roller; and
a power train system comprising gears and disposed between the loading motor and the loading roller the power train system comprising
a clutch gear disposed between gears of the power train system; and
a clutch lever comprising a guide pin inserted in a cam groove on a main slider, the clutch lever configured to operate the clutch gear in synchronization with a loading of the disc to block the power transmission path between the gears.

16. The disc loading device of claim 15, wherein the power train system comprise a worm wheel configured to receive a driving power from a clutch gear, such that the worm wheel changes a moving direction or a rotating direction.

17. The disc loading device of claim 16, wherein the power train system further comprises a worm shaft engaged with the worm wheel, and a rotary shaft of the worm shaft is orthogonal to a rotary shaft of the worm wheel.

18. The disc loading device of claim 15, wherein the loading roller is not driven in response to an emergency ejection operation.

19. The disc loading device of claim 15, wherein the power train system is configured to block a driving power to the loading roller during an emergency ejection operation.

* * * * *